Oct. 18, 1955
E. C. MAKI ET AL
2,720,866
HYDRAULICALLY OPERATED CLUTCH MOTOR WITH
PRESSURE OPERATED EXHAUST VALVE
Filed Feb. 7, 1952
2 Sheets-Sheet 1
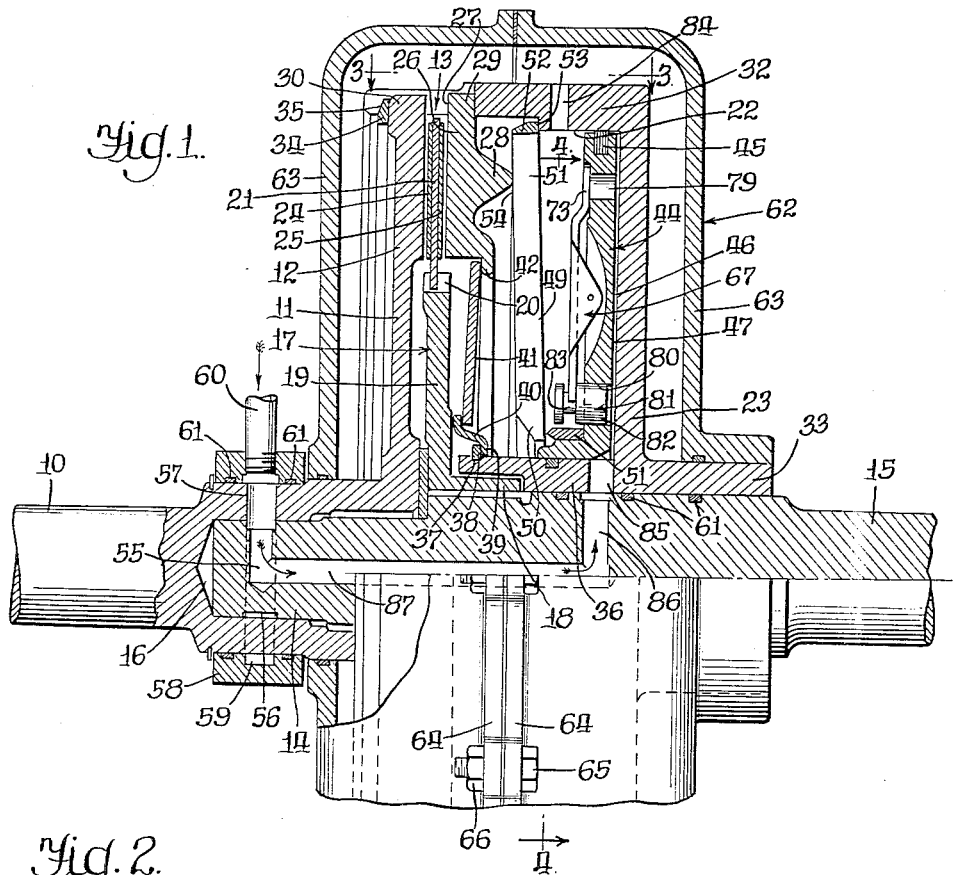
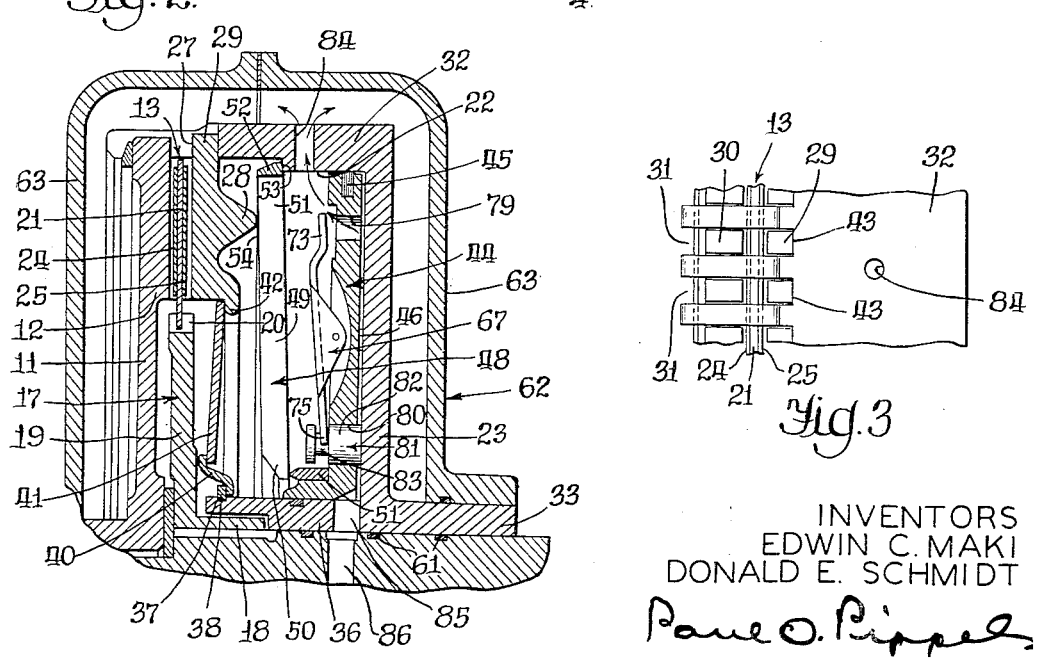
INVENTORS
EDWIN C. MAKI
DONALD E. SCHMIDT
Paul O. Pippel
ATT'Y Oct. 18, 1955
E. C. MAKI ET AL
2,720,866
HYDRAULICALLY OPERATED CLUTCH MOTOR WITH
PRESSURE OPERATED EXHAUST VALVE
Filed Feb. 7, 1952
2 Sheets-Sheet 2
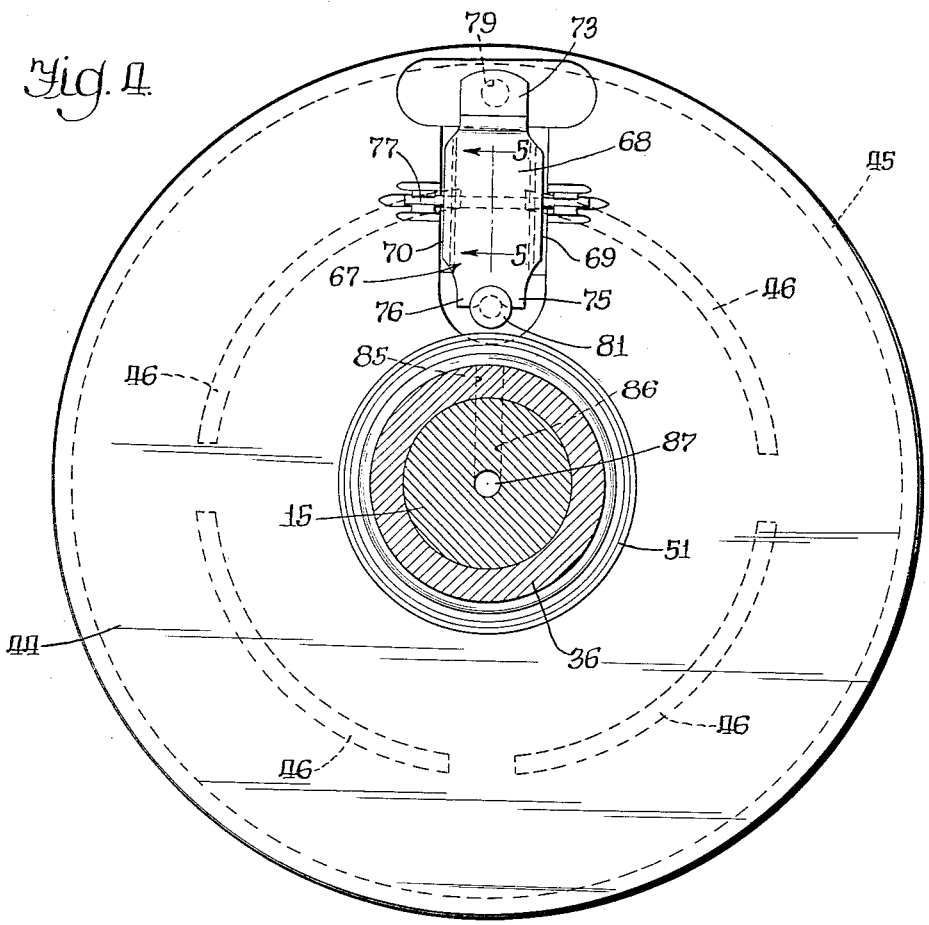
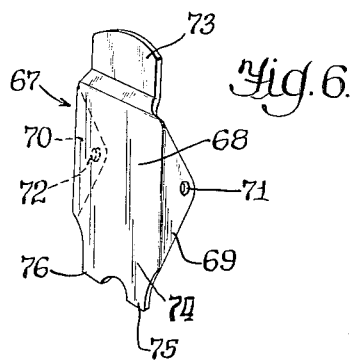
INVENTORS
EDWIN C. MAKI
DONALD E. SCHMIDT
Paul O. Pippel
ATT'Y United States Patent Office 2,720,866
Patented Oct. 18, 1955

2,720,866

HYDRAULICALLY OPERATED CLUTCH MOTOR WITH PRESSURE OPERATED EXHAUST VALVE

Edwin C. Maki and Donald E. Schmidt, Fort Wayne, Ind., assignors to International Harvester Company, a corporation of New Jersey Application February 7, 1952, Serial No. 270,386

15 Claims. (Cl. 121—38)

This invention relates to gripping devices such as clutches or the like and particularly to clutches of the friction type in which the relatively rotatable parts are forced together by fluid pressure to engage the clutch.

Fluid pressure energized friction clutches generally include a rotatable hydraulic cylinder, a relatively reciprocable piston within the cylinder forming one wall of a fluid receiving chamber. Fluid under pressure is admitted to the chamber to advance the piston in an axial direction against the action of clutch springs to engage the clutch members. In order to allow the clutch springs to disengage the clutch members it is necessary to drain the fluid from the fluid receiving chamber. It is obvious that if all of the fluid is not drained from the chamber a complete disengagement of the clutch friction elements is not insured since the centrifugal force of the fluid remaining in the chamber will cause a sufficient side or axial thrust to oppose the resilient action of the clutch springs and partially engage the friction elements. The primary objective of the present invention, therefore, is to provide a valve and valve controlling means for positively preventing self-energization of the clutch due to the development of centrifugal pressure in the body of fluid in the peripheral region of the chamber pursuant to rotation of the chamber.

Another object is to provide a new and improved valve and valve control means for quickly and positively releasing the fluid pressure produced by the rotation of a body of fluid contained in a fluid receiving chamber of a hydraulically operated friction clutch.

A further object is the provision of a pressure controlled valve for exhausting the fluid contained in the chamber of a hydraulically operated friction clutch upon the termination of exteriorly applied pressure to the fluid.

The foregoing and other important objects and desirable features inherent in and encompassed by the invention, together with many of the purposes and uses thereof, will become readily apparent from a reading of the ensuing description in conjunction with the annexed drawings, in which:

Figure 1 is a side elevational view of a clutch incorporating the invention; the clutch is partially in section to better illustrate the valve mechanism which is in its closed position;

Figure 2 is a cross-sectional view of a portion of the clutch showing the valve mechanism in its open position;

Figure 3 is a view taken substantially along line 3—3 of Figure 1;

Figure 4 is an end view of the hydraulic piston taken substantially along line 4—4 of Figure 1;

Figure 5 is an enlarged, fragmentary view of the pivotal connection between the piston and the valve mechanism; and Figure 6 is a perspective view of a portion of the valve mechanism.

Referring to the drawings in detail, wherein like reference characters designate like elements throughout the various views, there is shown a drive shaft 10 having a radially extending clutch plate 11 integrally formed on one end thereof. The clutch plate 11 has an annular boss 12 formed thereon which serves as one of the friction engaging surfaces of the clutch, designated generally by numeral 13. One end 14 of the driven shaft 15 extends into an axial recess 16 provided in the drive shaft 10 and is rotatably supported by the drive shaft. The driven clutch plate 17 has a hub portion 18 which is suitably fastened to the driven shaft 15 to rotate therewith. The clutch plate 17 includes a radial flange 19 having its peripheral edge 20 castellated for non-rotatably supporting a clutch ring 21, the opposing faces of which carry annular disks 24 and 25, respectively, of suitable high friction material. From the foregoing it will be understood that the clutch ring 21 is free to move axially with respect to the radial flange 19 but cannot rotate relatively to the flange.

The clutch pressure plate in the instant invention is in the form of a ring 26 having a flat surface 27 on one side thereof in axial alignment with the annular boss 12 and the annular disks 24 and 25. The opposite side of the pressure plate 26 has an integrally-formed, axially projecting annular ridge 28 thereon, the purpose of which will be explained hereinafter. The outer peripheral edges of the pressure plate 26 and the drive clutch plate 11 are provided with circumferentially spaced, radially extending lugs 29 and 30, respectively, which are received in circumferentially spaced, axially extending slots 31 formed in one end of a clutch drum 32. The clutch drum 32 encloses the clutch 13 and has a hub portion 33 rotatably supported on the driven shaft 15, as best shown in Figures 1 and 2. From the foregoing it will be obvious that the pressure plate 26, the drive clutch plate 11, and the clutch drum 32 are constrained to rotate together but the pressure plate 26 is capable of moving axially with respect to the clutch plate 11 and the clutch drum 32. A wedge-shaped snap ring 34 confined in an internal groove 35 in the clutch drum 32 prevents the clutch plate 11 from being moved axially to the left, as viewed in Figure 1, with respect to the clutch drum 32. Referring to Figures 1 and 2, it will be noted that the clutch drum 32 includes a sleeve 36 in axial alignment with the hub portion 33 and rotatably supported on the driven shaft 15. A groove 37 is cut in the outer surface of the sleeve 36 adjacent one end thereof for receiving a snap ring 38. The ring 38 serves as an abutment for one leg 39 of a Z-shaped spring retainer ring 40. A plurality of radially extending leaf spring members 41 having their outer ends connected together are interposed between the pressure plate 26 and the retainer ring 40. The outer ends of the leaf spring members 41 abut an inwardly projecting lip 42 formed on the pressure plate 26 and the inner ends thereof are confined by the retainer ring 40. It will be appreciated that the leaf spring members 41 resiliently urge the pressure plate 26 to the right, as viewed in Figure 1, causing the lugs 29 to engage the end wall 43 of the slots 31. In this position, the clutch 13 is disengaged since the clutch ring 21 is free to rotate with respect to the clutch plate 11 and the pressure plate 26. Upon the application of an axial force sufficient to overcome the resilient force of the leaf spring members 41 the pressure plate 26 moves to the left causing a frictional engagement between the clutch ring 21 and the clutch and pressure plates 11 and 26.

In order to move the pressure plate 26 against the resilient action of the leaf spring members 41 to engage the clutch 13 hydraulically, a circular plate-like piston, designated generally by numeral 44, is slidably mounted on the outer surface of the sleeve 36. The piston 44 has a plurality of oil sealing rings 45 mounted on its outer periphery which engage the interior surface 22 of the clutch drum 32. Four circumferentially spaced, segmental bosses 46 project from the piston 44 and abut the radially extending wall 23 of the clutch drum 32 when the clutch 13 is fully disengaged, as shown in Figure 1, to axially space the piston from the wall and allow an annular space 47 for receiving fluid under pressure. The force of the piston 44 as it moves to the left, as viewed in Figure 1, is transmitted to the pressure plate 26 by means of a spring device 48 which also functions as a force-multiplying lever unit. The spring device 48 includes a plurality of circumferentially spaced, radially extending spring fingers 49 which have their inner ends 50 engaging a hardened steel ring 51 rigidly fastened to the piston 44. The outer ends 51 of the fingers 49 are all joined together by an integrally-formed ring 52 which abuts a shoulder 53 formed by counter-boring the clutch drum 32. The annular ridge 28 formed on the pressure plate 26 is adapted to abut an intermediate portion 54 of each of the fingers 49. It will be noted that the intermediate portions 54 are radially spaced closer to the outer ends 51 than the inner ends 50 whereby the application of a given force on the inner ends 50 of the fingers 49, causing the fingers, in effect, to pivot about their outer ends 51, results in the transmission of a greater force to the pressure plate 26. The fingers 49 also resiliently urge the piston 44 to the right against the wall 23.

Fluid under pressure from an external source is introduced into the annular space 47 between the piston 44 and the wall 23 by means of a radial bore 85 in the sleeve 36 which communicates with a radial bore 86 formed in the driven shaft 15. Extending axially through the driven shaft 15 is a passageway 87 which has one end in liquid communication with the radial bore 86 and its opposite end in liquid communication with a radial bore 55 formed in the end 14 of the driven shaft 15. The bore 55 leads to an annular groove 56 cut in the outer surface of the driven shaft 15 which is in liquid communication with a passageway 57 in the drive shaft 10. Supported on the drive shaft 10 for rotation with respect thereto is a ring 58 which has an internal groove 59 in radial alignment with the passageway 57. A conduit 60 (partially shown in Figure 1) is fastened to the ring 58 and provides liquid communication between an external source such as a pump or the like (not shown) and the groove 59. Suitable oil sealing rings 61, shown somewhat diagrammatically in Figures 1 and 2, are interposed between the ring 58 and the drive shaft 10, the driven shaft 15 and the clutch drum 32, and the sleeve 36 and the piston 44 to prevent oil leakage. Enclosing the entire clutch 13 is a stationary housing 62 which includes a pair of cup-shaped members 63 having radial flanges 64 which are clamped together by means of a plurality of bolts 65 and nuts 66 to provide a fluid-tight casing for the clutch.

In operation fluid under external pressure is supplied to the annular space or chamber 47 through the liquid conduit means described above from an external source. The pressure of the fluid on the piston 44 causes it to move to the left, as viewed in Figure 1, against the combined resilient action of the fingers 49 and the leaf spring members 41. The force developed by the fluid pressure acting on the piston 44 is applied to the inner ends 50 of the fingers 49 resulting in a much larger force being applied to the pressure plate 26 to move the clutch plate 11 and the clutch ring 21 into frictional engagement. Upon release of the external fluid presure the piston 44 reverses its axial movement and the pressure plate 26 is returned to the position shown in Figure 1 by virtue of the leaf spring members 41, thereby disengaging the clutch ring 21 and clutch plate 11.

Inasmuch as the clutch 13 described above is generally rotating at relatively high speeds during the operation of the same it is evident that high, axially-directed pressures are developed in the annular chamber 47 in the vicinity of the outer periphery thereof by the centrifugal force of the fluid contained in the annular chamber. It is well known that the resulting axial thrust increases as the square of the R. P. M. and as the fourth power of the diameter of the chamber and is directly proportional to the mass of the fluid. Thus, to insure a rapid and complete disengagement of the clutch elements without the need of employing large clutch springs, valve means designated generally by numeral 67, are provided for positively draining all the fluid from the annular chamber 47 immediately upon the release of the external pressure on the fluid. The valve means 67 includes a rectangular plate 68 having its side marginal edges turned under to form a pair of spaced flanges 69, 70 which are provided with aligned apertures 71, 72. One end 73 of the plate 68 is depressed slightly, as best shown in Figure 6, while the opposite end 74 is provided with a pair of spaced legs 75, 76. A pin 77, having its ends rigidly connected in the manner shown in Figure 5 to the face 78 of the piston 44 opposite the face having the segmental bosses 46 thereon, extends through the apertures 71, 72 and pivotally supports the plate 68 for rocking movement about an axis perpendicular to the axis of rotation of the drive and driven shafts 10 and 15. Extending axially through the piston 44 adjacent its outer periphery is an exhaust port 79. As shown in Figure 1, the plate 68 is rockable to a position wherein the depressed end 73 completely covers the exhaust port 79. Spaced radially inwardly from the exhaust port 79 is another axially extending aperture 80 having a larger diameter than the exhaust port. A plunger 81 having a body portion 82 slidably supported in aperture 80, has a reduced-diameter neck section 83 which is embraced by the legs 75, 76 of the plate end 74. From the foregoing it will be appreciated that the application of a greater force at the plunger end of the plate 68 than at the exhaust port end will cause the plate to rock to the position shown in Figure 1 which represents the exhaust valve closed position. By the same token, if the force developed by the fluid acting on the exhaust port end exceeds the fluid force at the opposite end of the plate 68 the plate will rock to the position illustrated in Figure 2 to uncover the exhaust port 79 and allow the fluid in the chamber 47 to flow to the fluid reservoir (not shown) through a port 84 formed in the clutch drum 32.

Assuming that it is desired to couple the drive shaft 10 to the driven shaft 15 fluid under pressure from an external source is introduced into the annular chamber 47 of sufficient magnitude to move the piston 44 axially to engage the clutch plate and ring, 11 and 21 respectively. The pressure of the fluid due to the external pressure source is equally distributed over the face of the piston 44 and the pressure developed by the centrifugal force of the fluid within the chamber 47 is greatest in the zone adjacent the outer periphery of the chamber. Because of the relatively high magnitude of the external pressure in relation to the pressure developed by centrifugal force at all rotational speeds of the drive shaft 10 and the fact that the area of the plunger body 82 in contact with the pressure is much larger than the area of the depressed end 73 of the plate 68 which is in contact with the external pressure as well as the pressure developed by the centrifugal force of the chamber-contained fluid, the plate 68 is rocked to its closed position. It is to be understood that the fluid under the high external pressure is admitted into the chamber 47 rapidly with the result that the full external pressure is quickly distributed over the entire face of the piston 44. Immediately upon release of the external pressure on the fluid the only fluid pressure remaining in the chamber 47 is due to the centrifugal force of chamber-contained fluid which is, as stated above, greater in the vicinity of the exhaust port 79 than in the annular zone adjacent the plunger body 82. The force acting on the exhaust port end 73 of the plate 68, which is proportional to the pressure and the surface area upon which the pressure is acting, exceeds the force transmitted to the plate 68 by the plunger and rocks the plate 68 in a counter-clockwise direction, as viewed in Figure 1, to allow the fluid contained in the chamber 47 to flow to the fluid reservoir.

The embodiment of the invention chosen for the purposes of illustration and description herein is that preferred as the result of selective tests based upon requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed it:

1. In a hydraulic system; the combination comprising: a rotatable fluid receiving chamber having a wall movable upon increase in fluid pressure in said chamber, a valve alternately positionable respectively, to preclude and accommodate exhaust of fluid from said chamber, valve control means concurrently subjected to the pressure of fluid in said chamber at radially spaced zones therein and operable responsively to a fluid pressure ratio of the pressure at the radially innermost of said zones relatively to the pressure at the radially outermost of said zones incurred by centrifugal force upon the fluid pursuant to rotation of the chamber to cause opening of said valve, and said valve control means being operable responsively to an increase in the fluid pressure ratio to cause closing of said valve.

2. In a hydraulic system; actuating means comprising: a rotatable fluid receiving chamber comprising an end wall advanceable in an endwise direction responsively to an increase of fluid pressure in said chamber, means for introducing fluid under pressure into said chamber, said chamber having a fluid exhaust port in a wall section thereof adjacent the outer edge of said chamber, valve means settable in alternative positions respectively precluding and accommodating exhaust of fluid through said port, valve actuating means comprising a pressure responsive device operable when subjected to pressure of fluid in the chamber to set the valve in the port closing position, and said valve comprising an element operable responsively to the centrifugal pressure of the fluid in said chamber to prevail over the valve actuating means to effect opening of the valve upon termination of exteriorly applied pressure to the fluid in said chamber.

3. In a hydraulic system; actuating means comprising: a rotatable fluid receiving chamber comprising an end wall advanceable in an endwise direction responsively to an increase of fluid pressure in said chamber, a valve alternately positionable respectively to preclude and accommodate exhaust of fluid from said chamber, valve control means concurrently subjected to the pressure of fluid in said chamber at radially spaced zones therein and operable responsively to a fluid pressure ratio of the pressure at the radially innermost of said zones relatively to the pressure at the radially outermost of said zones concurred by centrifugal force upon the fluid pursuant to rotation of the chamber to cause opening of said valve, and said valve control means being operable responsively to an increase in the fluid pressure ratio to cause closing of said valve.

4. In a hydraulic system; actuating means comprising: a rotatable fluid receiving chamber comprising an end wall advanceable in an endwise direction responsively to an increase of fluid pressure in said chamber, a valve alternately positionable respectively to preclude and accommodate exhaust of fluid from said chamber, valve control means including a radially inner and a radially outer surface concurrently subjected to the pressure of fluid in said chamber, said surfaces being in communication with radially spaced zones in said chamber, said valve control means operable responsively to a fluid pressure ratio of the pressure at one of said zones relatively to the pressure of the other of said zones incurred by centrifugal force upon the fluid pursuant to rotation of the chamber to cause opening of said valve, and said valve control means being operable responsively to an increase in the fluid pressure ratio to cause closing of said valve.

5. The combination as set forth in claim 4, in which said radially inner surface has a larger fluid pressure contact area than said radially outer surface.

6. In a hydraulic system; actuating means comprising: a rotatable fluid receiving chamber having a pair of radially spaced apertures formed therein and comprising an end wall advanceable in an endwise direction responsively to an increase of fluid pressure in said chamber, a valve alternately positionable respectively to preclude and accommodate exhaust of fluid from said chamber, valve control means concurrently subjected to the pressure of fluid in said chamber through said apertures and operable responsively to a fluid pressure ratio of the pressure at the radially innermost of said apertures relatively to the pressure at the radially outermost of said apertures incurred by centrifugal force upon the fluid pursuant to rotation of the chamber to cause opening of said valve, and said valve control means being operable responsively to an increase in the fluid pressure ratio to cause closing of said valve.

7. The combination as set forth in claim 6, in which the innermost of said radially spaced apertures has a larger diameter than said outermost aperture.

8. In a hydraulic system; actuating means comprising: a rotatable fluid receiving chamber having a pair of radially spaced apertures formed therein comprising an end wall advanceable in an endwise direction responsively to an increase of fluid pressure in said chamber, a valve alternatively positionable respectively to preclude and accommodate exhaust of fluid from said chamber, valve control means including surfaces concurrently subjected to the pressure of fluid in said chamber through said apertures and operable responsively to a fluid pressure ratio of the pressure transmitted to one of said surfaces through the radially innermost of said apertures relatively to the pressure transmitted to the other of said surfaces through the outermost of said apertures incurred by centrifugal force upon the fluid pursuant to rotation of the chamber to cause opening of said valve, and said valve control means being operable responsively to an increase in the fluid pressure ratio to cause closing of said valve.

9. In a hydraulic system; the combination comprising: a rotatable fluid receiving chamber having a wall structure including a wall advanceable upon an increase in fluid pressure in said chamber, said wall structure having an exhaust port in a radially outer portion thereof for discharging fluid from said chamber and a radially inwardly spaced aperture, valve means positionable respectively to preclude and accommodate discharge of fluid through said exhaust port, valve control means including a portion of said valve means having surfaces concurrently subjected to the pressure of fluid in said chamber through said exhaust port and aperture and operable responsively to a fluid pressure ratio of the pressure transmitted to one of said surfaces through said aperture relatively to the pressure transmitted to the other of said surfaces through said exhaust port incurred by centrifugal force upon the fluid pursuant to rotation of the chamber to cause opening of said valve, and said valve control means being operable responsively to an increase in the fluid pressure ratio to cause closing of said valve.

10. In a hydraulic system; the combination comprising: a rotatable fluid receiving chamber having a wall structure including a wall shiftable upon an increase in fluid pressure in said chamber, said wall structure having an exhaust port in a radially outer portion thereof for discharging fluid from said chamber and a radially inwardly spaced aperture, a valve member alternatively positionable over one end of said exhaust port to respectively preclude and accommodate exhaust of fluid from said chamber, valve control means including said valve member and a plunger slidable in said aperture, said valve member and plunger having surfaces concurrently subjected to the pressure of fluid in said chamber through said exhaust port and aperture, respectively, and said valve control means being responsive to a fluid pressure ratio of the pressure transmitted to said plunger surface through said aperture relatively to the pressure transmitted to said valve member surface through said exhaust port incurred by centrifugal force upon the fluid pursuant to rotation of the chamber to cause opening of said valve member and said valve control means being operable responsively to an increase in the fluid pressure ratio to cause closing of said valve member.

11. The combination as set forth in claim 10, in which said plunger surface has a greater fluid pressure contact area than said valve member surface.

12. In a hydraulic system; the combination comprising: a rotatable fluid receiving chamber having a wall structure including a wall shiftable upon an increase in fluid pressure in said chamber, said wall structure having an exhaust port in a radially outer portion thereof and a radially inwardly spaced aperture, a member pivotally connected to said wall structure intermediate said exhaust port and aperture and alternatively movable between a first position wherein one end of said member is positioned over one end of said exhaust port to preclude exhaust of fluid from said chamber and a second position wherein said one end of said member uncovers said exhaust port to accommodate exhaust of fluid from said chamber, a plunger slidable in said aperture having one end operatively connected to said member, said one end of said member and said plunger having surfaces concurrently subjected to the pressure of fluid in said chamber through said exhaust port and aperture, respectively, and said member being movable between said first and second positions in response to a fluid pressure ratio of the pressure transmitted to said plunger surface through said aperture relatively to the pressure transmitted to the end of the member positionable over said exhaust port incurred by centrifugal force upon the fluid pursuant to rotation of the chamber to cause said member to move in said second position, and said member being movable to said first position in response to an increase in the fluid pressure ratio.

13. In a hydraulic system; the combination comprising: a rotatable fluid receiving chamber including a wall shiftable upon an increase in fluid pressure in said chamber, said wall having an exhaust port in a radially outer portion thereof for discharging fluid from said chamber, valve means movable to alternate positions respectively precluding and accommodating exhaust of fluid through said exhaust port, said valve means having a surface in direct contact with the fluid in said chamber, the application of the fluid pressure on said surface producing a force tending to open said valve means, pressure responsive means operably connected to said valve means having a surface in direct contact with the fluid in said chamber, said surface being spaced radially inwardly from said valve means surface, the application of the fluid pressure on said pressure responsive means surface producing a force to close said valve means in opposition to the force produced by the fluid pressure acting on said valve means surface, the centrifugal pressure of the fluid in said chamber being greater in the vicinity of said valve means surface to produce a force to overcome the force applied to said pressure responsive means surface to effect opening of said valve means upon termination of exteriorly applied pressure to the fluid in said chamber.

14. The combination as set forth in claim 13, in which said pressure responsive means surface has a larger area in contact with the fluid in said chamber than said valve means surface.

15. In a hydraulic system; the combination comprising: a rotatable fluid receiving chamber having a wall structure including a wall advanceable upon an increase in fluid pressure in said chamber, said chamber having an inlet port for receiving fluid under exteriorly applied pressure, said wall having an exhaust port in a a radially outer portion thereof for discharging fluid from said chamber, valve means movable to alternate positions respectively precluding and accommodating exhaust of fluid through said exhaust port, said valve means having a first surface in direct contact with the fluid in said chamber, the application of the fluid pressure on said surface producing a force tending to open said valve means, pressure responsive means operably connected to said valve means, said pressure responsive means having a second surface in direct contact with the fluid in said chamber, said second surface being spaced radially inwardly from said first surface and having a larger area than said first surface, the application of the fluid on said second surface producing a force overcoming the force produced on said first surface to close said valve means, said forces being proportional to the areas of said surfaces and the pressure acting on the same, the centrifugal pressure of the fluid in said chamber being greater in the vicinity of said first surface to produce a force to overcome the force applied to said second surface to effect opening of said valve means upon termination of exteriorly applied pressure to the fluid in said chamber.

References Cited in the file of this patent

UNITED STATES PATENTS

| | | |
|---|---|---|
| 2,143,321 | Kegresse | Jan. 10, 1939 |
| 2,163,203 | Kegresse | June 20, 1939 |
| 2,297,480 | Kratzmann | Sept. 29, 1942 |
| 2,440,589 | Kegresse | Apr. 27, 1948 |
| 2,583,919 | Wilson | June 29, 1952 |
| 2,588,724 | Hobbs et al. | Mar. 11, 1952 |
| 2,642,844 | Flinn | June 23, 1952 |

FOREIGN PATENTS

| | | |
|---|---|---|
| 402,912 | Germany | Feb. 15, 1924 |
| 643,678 | Germany | Sept. 27, 1934 |